United States Patent
Morel et al.

(10) Patent No.: US 7,440,819 B2
(45) Date of Patent: Oct. 21, 2008

(54) ANIMATION SYSTEM FOR A ROBOT COMPRISING A SET OF MOVABLE PARTS

(75) Inventors: Cyrille C. Morel, Paris (FR); Thierry Planterose, Paris (FR)

(73) Assignee: Koninklijke Philips Electronics N.V., Eindhoven (NL)

(*) Notice: Subject to any disclaimer, the term of this patent is extended or adjusted under 35 U.S.C. 154(b) by 688 days.

(21) Appl. No.: 10/512,625

(22) PCT Filed: Apr. 22, 2003

(86) PCT No.: PCT/IB03/01585

§ 371 (c)(1),
(2), (4) Date: Oct. 26, 2004

(87) PCT Pub. No.: WO03/092967

PCT Pub. Date: Nov. 13, 2003

(65) Prior Publication Data

US 2005/0177276 A1    Aug. 11, 2005

(30) Foreign Application Priority Data

Apr. 30, 2002    (FR)    .................................. 02 05437

(51) Int. Cl.
*G06F 19/00* (2006.01)

(52) U.S. Cl. ........................ 700/245; 700/264; 700/260; 700/259; 700/253; 700/218; 715/863; 715/700; 345/474; 345/473; 345/424; 348/211.6; 348/121

(58) Field of Classification Search ................. 700/245, 700/264, 260, 259, 253, 218; 345/474, 473, 345/424; 715/700, 863; 348/211.6, 121
See application file for complete search history.

(56) References Cited

U.S. PATENT DOCUMENTS

| | | | | |
|---|---|---|---|---|
| 3,510,210 A | * | 5/1970 | Von Haney | .................. 352/39 |
| 4,631,676 A | * | 12/1986 | Pugh | .......................... 600/595 |
| 5,289,273 A | * | 2/1994 | Lang | .......................... 348/121 |
| 5,586,224 A | * | 12/1996 | Kunii et al. | ................. 700/260 |
| 5,825,982 A | * | 10/1998 | Wright et al. | ............... 700/259 |
| 5,867,592 A | * | 2/1999 | Sasada et al. | ............... 382/154 |
| 5,982,389 A | * | 11/1999 | Guenter et al. | ............. 345/474 |
| 6,088,628 A | * | 7/2000 | Watanabe et al. | ........... 700/264 |
| 6,111,580 A | * | 8/2000 | Kazama et al. | ............. 715/863 |
| 6,144,385 A | * | 11/2000 | Girard | ........................ 345/424 |
| 6,157,873 A | * | 12/2000 | DeCamp et al. | ............ 700/253 |
| 6,246,924 B1 | * | 6/2001 | Holdgreve | .................. 700/218 |

(Continued)

FOREIGN PATENT DOCUMENTS

JP            200196481            4/2001

*Primary Examiner*—Thomas G. Black
*Assistant Examiner*—Wae Louie

(57) ABSTRACT

The object of the invention is to make the movable parts of a robot reproduce the movement of the movable parts of an animated object, via the transmission of movement parameters to the robot in a primary signal PS. The primary signal PS comprises sets of parameters associated with the movable parts of the animated object, the sets of parameters being inserted in said primary signal according to a hierarchical graph structure reflecting the structure of the movable parts of said animated object. The movable parts of the robot reproduce the movement characterized by the movement parameters comprised in the sets of parameters which are associated with them. Use: An animation system for a robot.

20 Claims, 3 Drawing Sheets

U.S. PATENT DOCUMENTS

Figure 1:
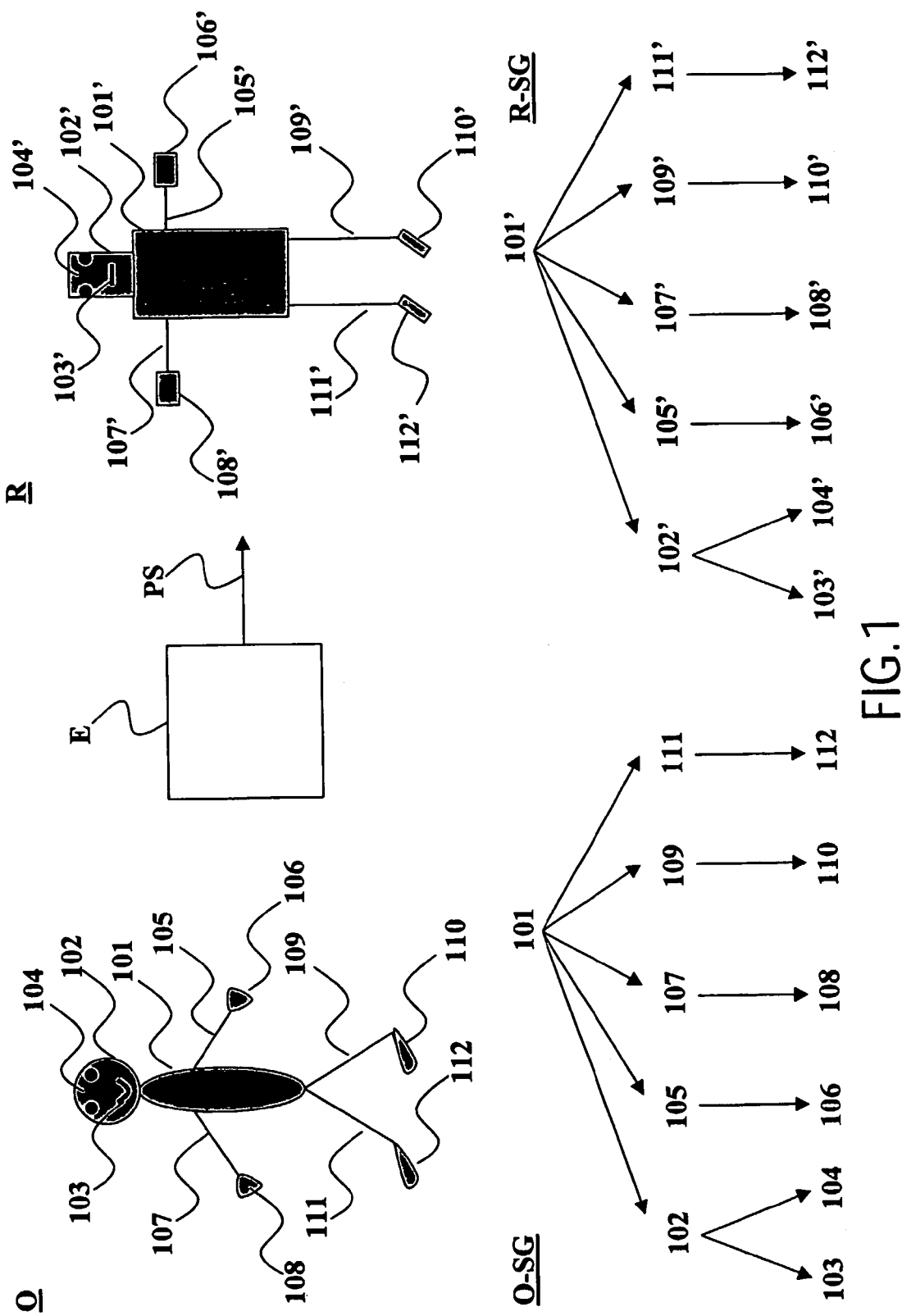

| | | | |
|---|---|---|---|
| 6,343,131 B1 * | 1/2002 | Huopaniemi | 381/310 |
| 6,377,281 B1 * | 4/2002 | Rosenbluth et al. | 715/700 |
| 6,430,472 B1 * | 8/2002 | Boillot et al. | 700/245 |
| 6,442,450 B1 * | 8/2002 | Inoue et al. | 700/245 |
| 6,714,841 B1 * | 3/2004 | Wright et al. | 700/259 |
| 6,803,946 B1 * | 10/2004 | Wakiyama et al. | 348/211.6 |
| 6,826,293 B2 * | 11/2004 | Matsunaga | 382/106 |
| 6,911,982 B1 * | 6/2005 | Signes | 345/473 |
| 6,944,584 B1 * | 9/2005 | Tenney et al. | 703/22 |
| 7,106,334 B2 * | 9/2006 | Imagawa et al. | 345/474 |
| 2003/0023348 A1 * | 1/2003 | Inoue et al. | 700/245 |

* cited by examiner

ANIMATION SYSTEM FOR A ROBOT COMPRISING A SET OF MOVABLE PARTS

The invention relates to an animation system for animating a robot comprising a set of movable parts.

The invention has many applications in communication systems where the movement of an object or a person must be reproduced by a distant robot, in the context of industrial or domestic applications.

The use of robots is known in industrial environments for performing a set of complex repetitive tasks. The use of robots is also known in the context of domestic applications, in particular as a "helper robot".

The Japanese patent No. P2001-96481A describes an animation system for a robot and a robot taking the appearance of a dog, said robot comprising means for reproducing an action sent in the form of a control signal from a transmitter of the computer or remote control type. The robot is provided with movable parts for reproducing said action, for example an action corresponding to a movement of the feet or head.

The robot known from the document of the prior art is provided with a signal processor and a memory of the ROM type for storing a set of programs and parameters enabling the robot to reproduce a given series of actions. The robot is also in a position to interrupt an action currently being executed if a control signal received reflects the fact that another action to be performed must be reproduced.

The animation system and the robot known from the document of the prior art have a certain number of limitations.

The behavior of the robot described by the document of the state of the art is modified by the sending of a control signal enabling actuators to make the movable parts of the robot reproduce an action, in particular a movement action.

Since the behavior of the robot is mainly determined by a set of programs and parameters previously stored in memory, a control signal received by the robot can only partially modify the behavior of the robot. Because of this largely predetermined behavior, the robot known from the document of the state of the art is limited in its behavior.

Accepting the eventuality that the programs and parameters stored in memory are changed from time to time in order to change the overall behavior of the robot, because of the large volume of data to be loaded, such an operation would require a significant amount of time because of the small bandwidth of the communication channel between the robot and the transmitting system. In addition to the lack of flexibility, such an operation would be difficult for a user to perform.

From the point of view of hardware resources, the robot known from the document of the state of the art requires a memory of large capacity for storing the programs and action parameters, which results in an expensive product.

One object of the invention is to make the movable parts of a robot reproduce the movement of the movable parts of an animated object, via the transmission of movement parameters to the robot in a primary signal, conferring flexibility of use and leading to an economical solution.

The invention relates to an animation system for a robot comprising:
a) a transmitter comprising:
  means for creating a primary signal comprising sets of parameters for describing the movement of a set of movable parts of an animated object, a set of parameters comprising:
    aa) an identification parameter for associating a movable part with the set of parameters in question;
    bb) movement parameters for describing the movement of the movable part associated with the set of parameters,
  transmission means for transmitting said primary signal,
b) a robot comprising:
  reception means for receiving said primary signal,
  movable parts able to be moved by control signals,
  processing means for successively processing the sets of parameters comprised in the primary signal received, said processing means comprising:
    aa) association means for, using the identification parameter, associating a movable part of the robot with the set of parameters,
    bb) generation means for, using the movement parameters, generating said control signals to the movable part associated with the set of parameters, for the purpose of making said associated movable part reproduce the movement characterized by said movement parameters.

The invention proposes to code said primary signal transmitted to the robot according to a syntax dedicated to describing and transmitting characteristics of an animated object.

A coding syntax for describing the characteristics of an object in a scene is known from the standard bearing the reference MPEG-4 ISO/IEC 14496-1 and MPEG-4 ISO/IEC 14496-2. This coding syntax is peculiar to the normative functionality bearing the name MPEG-4 BIFS (from the English "BInary Format for Scene description"). According to this functionality, with a scene coded according to the MPEG-4 standard and comprising multimedia scene elements (of the audio, text, graphical, video etc type), there is associated a data signal coded according to the requirements of the MPEG-4 BIFS functionality describing the parameters of said scene elements. In particular, the description parameters make it possible to describe animation characteristics for animated objects with regard to their shape and spatio-temporal positioning in said multimedia scene. The animation parameters of the scene elements are coded according to the coding syntax of the MPEG-4 BIFS Anim functionality, whilst the parameters for updating the scene elements are coded according to the coding syntax of the MPEG-4 BIFS Update functionality.

This movement parameter coding mode is advantageously used in the present invention for transmitting to a robot the movement parameters for the movable parts of an animated object for the purpose of making the movable parts of a robot reproduce the movement characterized by said parameters. "Animated object" means a physical object, a virtual object, a person or an animal. In this way the robot is in a position to reproduce the movements of the animated object.

For each movable part of the animated object, the movement parameters are inserted in a set of parameters, normally referred to as a "node" according to the MPEG-4 BIFS functionality, said set of parameters being identified so as to establish a correspondence at the robot between the set of parameters and a movable part of the robot. The sets of parameters are arranged so as to form a graph with a hierarchical structure reflecting the structure and arrangement of the movable parts of the animated object with respect to one another.

A set of parameters comprises the movement parameters for describing the movement of the movable part of the animated object which corresponds to it, for example priorities for describing the spatial position of the movable part by means of coordinates in an orthonormal reference frame, by means of polar coordinates, or by means of a parameterized transformation of the rotation/translation type.

Using such a coding mode for sending movement parameters to the robot has the advantage of reducing the volume of the information to be transmitted to the robot since the MPEG-4 BIFS functionality makes provision on the one hand for sending the animation parameters according to a differential mode, and on the other hand provides for the compression of the signal by a quantization mechanism. In this way, only a connection with a small bandwidth is necessary for transmitting the movement parameters to the robot.

Another advantage to the use of the MPEG-4 BIFS functionality is to be able to transmit to the robot a continuous flow of movement parameters in the primary signal, a transmission mode known by the term "streaming". In this way, the robot does not need to first load a minimum set of movement parameters for its functioning. The robot therefore executes in real or pseudo-real time the movement characterized by the movement parameters comprised in said primary signal. Consequently a robot according to the invention is no longer obliged to have available large memory resources, which leads to an economical solution.

Finally, the use of the MPEG-4 BIFS functionality makes the coding of the primary signal transmitted to the robot normative, which on the one hand facilitates the control of a plurality of robots by the same control signal and on the other hand facilitates the exchange of movement parameters between a group of robots.

According to a particular embodiment, the system described above comprises movement capture means for generating movement parameters characterizing the movement of each movable part of the animated object.

This application makes it possible to make the robot reproduce the movements of the animated object. In particular, the animated object corresponds to a person equipped with movement sensors on his various limbs. In this case, the movement parameters of the various limbs of the person are captured and inserted in the primary signal. The primary signal thus created is transmitted to a robot comprising movable parts able to reproduce the movements of said limbs. By means of an association mechanism, each set of parameters received by the robot is associated with a movable part of the robot reproducing the movement characterized by the movement parameters comprised in said set of parameters.

The purpose of such an application is to reproduce at a user the actual movements of a distant person so as to simulate his physical presence to the user.

According to a particular embodiment, the animation system comprises audio coding means for coding an audio signal transmitted by said animated object, in order to generate an audio signal transmitted with said primary signal by said transmission means, said robot comprising means for decoding and reproducing said audio signal.

In addition to the capture of the movement parameters, this embodiment makes it possible, via audio sensors, to make the robot reproduce the audio signal transmitted by the animated object, that is to say the speech signal if it is a case of a person. Thus the audible expression of the robot is merged with that of the distant person. For the purpose of reducing the volume of information, the audio signal is advantageously coded by an audio coder situated in said transmitter before being transmitted.

This application advantageously replaces an application of the video conference type. This is because, rather than displaying the distant person on an audio/video display, the distant person is actually represented by the robot, which is in a position to reproduce the actions and the speech signal of the distant person.

The advantage of such an application is to transmit only compact information on the communication channels (the primary signal and audio signal), unlike an application of the video conference type (for example according to the standard H.324) requiring the sending of video information of good visual quality but at a high rate, or with a low video rate but low visual quality.

This application can be used in the context of distance learning during which the movements of a teacher distant with respect to a student are reproduced by a robot situated close to the student.

This application can be used in the context of a surgical operation at a distance for reproducing the actions of a surgeon distant from the patient, the patient then being operated on by the robot.

This application can be used for enabling a deaf person to correspond with a distant correspondent if the movement of the hands and mouth of this correspondent are reproduced by a robot situated close to the deaf person.

The invention also relates to an animation system for a robot comprising:
  a) a receiver for receiving a multimedia data signal composed of scene elements, associated with a scene description signal for describing said scene elements by means of description parameters, said multimedia data signal comprising an animated scene element comprising a set of movable parts, said scene description signal comprising sets of parameters for describing the movement of said movable parts, the sets of parameters comprising:
    aa) an identification parameter for associating a movable part with the set of parameters in question,
    bb) movement parameters for describing the movement of the movable part associated with the set of parameters,
  said receiver comprising:
    extraction means for extracting from said scene description signal the movement parameters of said animated object, and generating a primary signal comprising said movement parameters,
    transmission means for transmitting said primary signal to the robot;
  b) a robot comprising:
    reception means for receiving said primary signal,
    movable parts able to be moved by control signals,
    processing means for successively processing the sets of parameters comprised in the primary signal received, said processing means comprising:
    aa) association means for, using the identification parameter, associating a movable part of the robot with the set of parameters,
    bb) generation means for, using the movement parameters, generating said control signals to the movable part associated with the set of parameters, for the purpose of making said associated movable part reproduce the movement characterized by said movement parameters.

This application enables a robot to reproduce movements of an animated object of the scene element type (for example an avatar or a person), the animated scene element in particular forming part of a multimedia scene coded according to the MPEG-4 standard. In order to generate the primary signal transmitted to the robot, only the movement parameters of the animated scene element are extracted from the scene description signal by the receiver.

According to an additional characteristic, the receiver comprises scene composition means for generating a scene signal from the multimedia data signal and the scene description signal, the content of said scene signal being intended to be played by display and listening means.

The movements of the animated scene element being reproduced by the robot situated alongside the display means, the display of the content of the multimedia scene is made more attractive and lively.

The multimedia data signal associated with the scene description signal can for example be delivered by a television program supplier (broadcaster) or by a network game device. By choosing to make the robot reproduce the movements of an animated scene element forming part of this multimedia scene, this application affords greater "immersion" in the multimedia scene content.

According to an additional characteristic, the robot comprises modification means for modifying the sets of parameters included in the primary signal received.

This characteristic makes it possible to adapt the sets of parameters included in the primary signal to the capabilities of the robot. Thus, if movement parameters are such that the capabilities of the robot do not make it possible to reproduce the corresponding movement, the value of the movement parameters included in said sets of parameters are modified, or even omitted.

According to an additional characteristic, the robot comprises:
  voice recognition means for an external audio signal for generating a voice parameter,
  matching means for matching said voice parameter with additional movement parameters characterizing the movement of one or more movable parts of the robot, said generation means generating a control signal from said additional movement parameters.

This additional characteristic enables a user to interact with the movements of the robot by voice.

According to an additional characteristic, the robot comprises means for retransmitting said primary signal.

This characteristic makes it possible to transmit the content of the primary signal to a set of robots so that the movements characterized by the sets of parameters contained in said primary signal are simultaneously reproduced by this set of robots.

The invention also relates to a robot as described in the above applications and comprising:
  reception means for receiving a primary signal, said primary signal comprising sets of parameters for describing the movement of a set of movable parts of an animated object, a set of parameters comprising:
    aa) an identification parameter for associating a movable part with the set of parameters in question,
    bb) movement parameters for describing the movement of the movable part associated with the set of parameters,
  movable parts able to be moved by control signals,
  processing means for successively processing the sets of parameters included in the primary signal received, said processing means comprising:
    aa) association means for, using the identification parameter, associating a movable part of the robot with the set of parameters,
    bb) generation means for, using the movement parameters, generating said control signals to the movable part associated with the set of parameters, for the purpose of making said associated movable part reproduce the movement characterized by said movement parameters.

The invention also relates to a signal coded according to the coding syntax of the MPEG-4 BIFS functionality for controlling the movement of the movable parts of a robot, said coded signal comprising sets of parameters, a set of parameters comprising an identification parameter for associating a movable part with a set of parameters in question and movement parameters for describing the movement which said movable part is to be made to reproduce.

The invention will be further described with reference to examples of embodiments shown in the drawings to which, however, the invention is not restricted.

Figure 2:
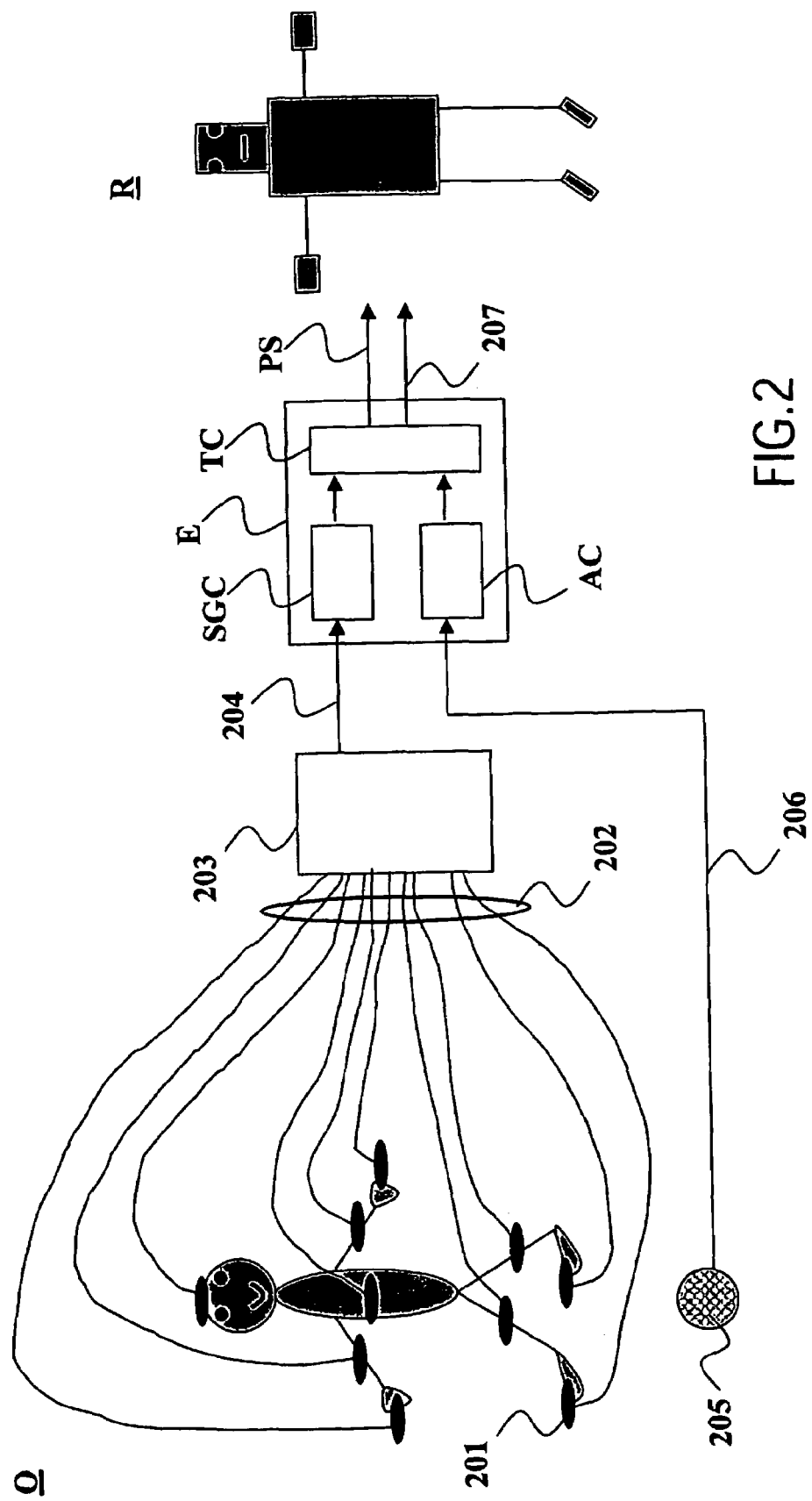
Figure 3:
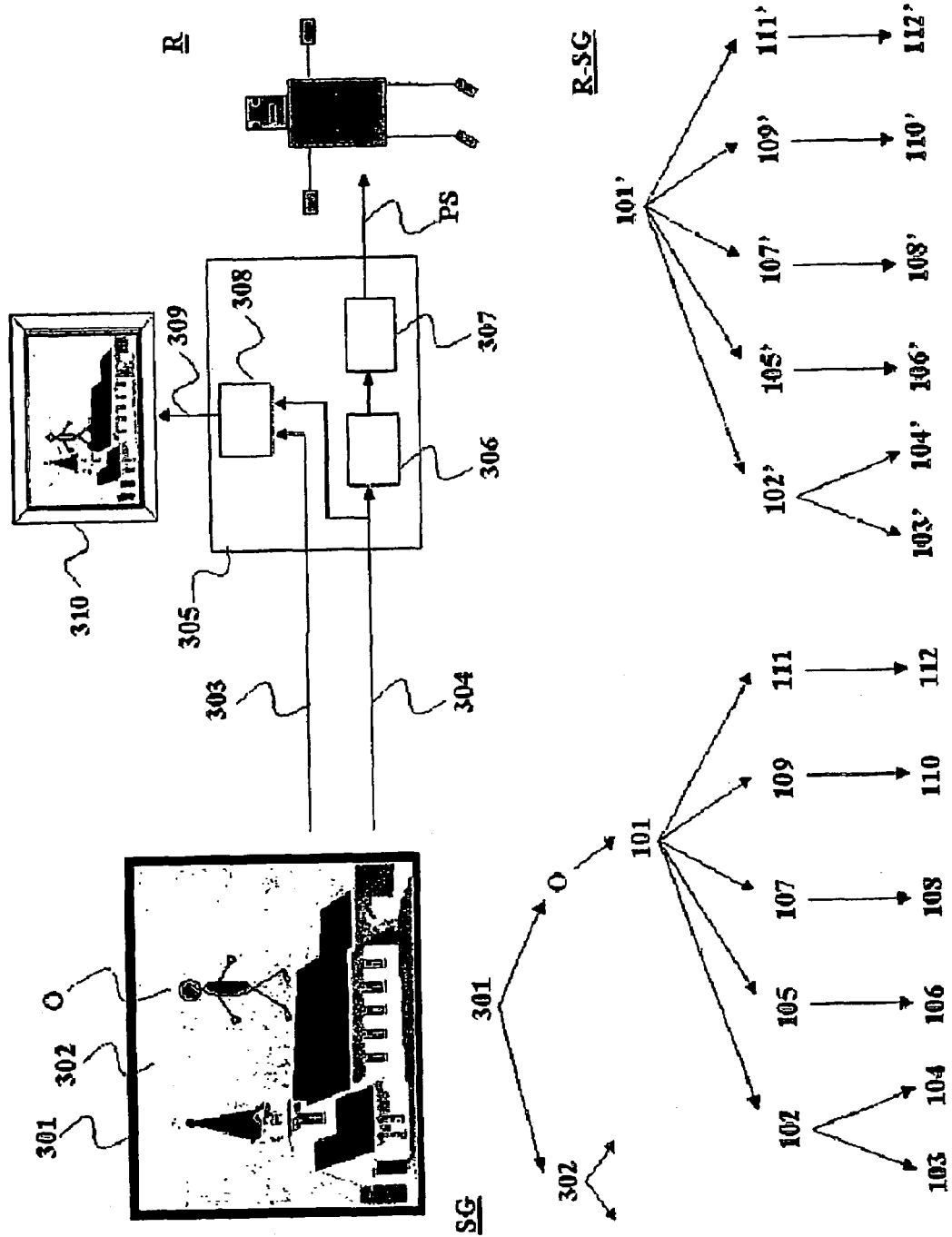

FIG. 1 describes schematically an animation system for a robot according to the invention, FIG. 2 describes a first application of an animation system for a robot according to the invention, FIG. 3 describes a second application of an animation system for a robot according to the invention.

FIG. 1 describes schematically an animation system for a robot according to the invention comprising a transmitter E for transmitting a primary signal PS to a robot R. The purpose of the transmission of the primary signal PS to the robot R is to make the robot R reproduce the movements of an animated object O.

The animated object O resembles here a person comprising a set of movable parts 101-112) (body 101, head 102, mouth 103, eyes 104, left arm 105, left hand 106, right arm 107, right hand 108, left leg 109, left foot 110, right leg 111, right foot 112). The movable parts form a hierarchical structure graph O-SG for describing the arrangement of the movable parts with respect to one another.

A movable part is described by a set of parameters comprising:
  an identification parameter for associating the movable part with the set of parameters in question. For example, the identification parameter may correspond to a single numerical value.
  movement parameters for describing the movement of the movable part associated with the set of parameters. For example, the movement can be described by spatial coordinates of one or more points defining the movable part, by a transformation of the rotation type characterized by a center and an angle, or by a translation characterized by a vector.

The transmitter E comprises means for creating the primary signal PS from the movement parameters of each of the movable parts 101-112. The primary signal PS is a signal coded according to the syntax of the MPEG-4 BIFS functionality, in which each set of parameters is considered to be a node within the meaning of the MPEG-4 BIFS functionality, or more precisely as an upper hierarchy node (also referred to as a "parent node") if other nodes depend on it, or as a lower hierarchy node (also referred to as a "child node") if it depends on other nodes. The signal PS therefore consists of the coding of the hierarchical structure of the animated object O by arranging the sets of parameters according to this structure.

Through this hierarchical structure, a movement allocated to an upper hierarchy movable part is also applied to the lower hierarchy movable parts. For example, the movement of the movable part 102 is also applied to the parts 103 and 104. Likewise, the movement parameters of the movable part 105 are also applied to the part 106.

The signal PS is transmitted by transmission means included in the transmitter E to a robot R comprising a set of movable parts 101'-112' for reproducing the movement of the movable parts of the animated object O.

After reception by the robot of the primary signal PS comprising the sets of parameters describing the movement of the movable parts of the animated object O, association means associate each movable part of the robot with a set of parameters. This association is made using the identification parameter contained in each set of parameters. Thus the movable part 101' is associated with a set of parameters of the movable part 101, the movable part 102' is associated with a set of parameters of the movable part 102, etc.

The association means make it possible to generate a hierarchical structure graph R-SG for describing the arrangement of the movable parts 101'-112' with respect to one another. The movable parts of the robot R being similar in their structure to the movable parts of the animated object O, the structure and movement of the movable parts 101-112 are respectively reproduced by the movable parts 101'-112'. The graph R-SG is identical to the graph O-SG.

The movable parts of the robot R are moved by control signals applied to mechanical actuators, not shown here. The control signals applied to the actuators are generated by generation means for the purpose of making the associated movable part reproduce the movement characterized by the movement parameters contained in each set of parameters 101'-112'. These generation means consist of transcribing the movement parameters into a signal which can be used by said actuators. For example, the generation means transcribe the movement parameters into an electrical or pneumatic signal enabling the actuator to effect the movement to the movable part.

FIG. 2 describes a first application of an animation system according to the invention. This application comprises means of sensing the movement of the movable parts of a person O. These movement sensing means comprise movement sensors 201 disposed on each of the movable parts whose movement is to be reproduced by the robot R. These sensors 201 deliver a set of signals 202 containing a physical quantity reflecting the movement of each of the movable parts. These signals 202 are delivered to processing means 203 for transforming the physical quantity of each signal into movement parameters 204 sent to means of creating a graph structure SGC. Using the parameters 204, the means SGC create a graph structure of the same type as the structure O-SG described in FIG. 1, following the structural hierarchy of the movable parts of the animated object O. The means SGC deliver the primary signal to be sent to the robot R.

Such an application can also comprise audio recording means 205 for picking up an audio signal 206 transmitted by the person O. The signal 206 is advantageously coded by an audio coder AC comprised in the transmitter E, for example a coder according to the MP3 standard making it possible to reduce the volume of the audio data to be transmitted.

The signals PS and 207 are transmitted to the robot R. For this purpose, they can be coded in advance by means TC according to various transportation protocols. For example, these signals can be inserted in an MPEG-2 transportation flow by a multiplexer before being transmitted packet by packet over a network. These signals can also be coded by coders according to the DECT, BLUETOOTH, GPRS or UMTS transportation protocols before being sent over a wireless network.

The robot R comprises reception means for extracting the signals PS and 207 coded according to one or more of the transportation protocols mentioned above.

The robot R comprises an audio decoder for decoding the audio signal 207, for example a decoder according to the MP3 standard. The audio signal thus decoded is played by audio reproduction means of the loudspeaker type comprised in the robot.

To process the signal PS, the robot R comprises processing means identical to those described in FIG. 1.

This application makes it possible to advantageously replace an application of the video conferencing type using display means on a screen. This is because, rather than displaying the distant person on an audio/video display, the distant person is actually represented by the robot, which is in a position to reproduce the actions and the speech signal of the distant person.

This application can be used in the context of distance learning during which the movements of a teacher who is distant with respect to a student are reproduced by a robot situated close to the student.

This application can be used in the context of a surgical operation at a distance for reproducing the actions of a surgeon distant from a patient, the patient then being operated on by the robot.

This application can be used to enable a deaf person to correspond with a distant correspondent if the movement of the hands and mouth of this correspondent are reproduced by a robot situated close to the deaf person.

FIG. 3 describes a second application of an animation system according to the invention. This second application allows the reproduction by a robot R of the movements of an animated object O forming the scene element of a multimedia scene 301.

In addition to the scene element O, the multimedia scene 301 is composed of scene elements of the audio, text or graphical type, or a scene element 302 of the video type as in this example. The multimedia scene is advantageously coded according to the MPEG-4 standard. Thus the spatio-temporal characteristics of the scene elements O and 302 are described by description parameters comprised in a scene description signal coded according to the syntax of the MPEG-4 BIFS functionality.

The movable parts of the animated scene element O being identical to those described in FIG. 1, the scene description signal constitutes a graph whose hierarchical structure is represented by the graph SG. This graph comprises a first hierarchy for describing the spatio-temporal characteristics of the element 302 (characteristics not detailed in FIG. 3) and a second hierarchy for describing the movement parameters of the scene element O. In an identical fashion to FIG. 1, the movement of each movable part 101-112 of the scene element O is described by a set of parameters.

The scene elements are comprised in a multimedia data signal 303 associated with the scene description signal 304. These signals are for example delivered by a television program supplier.

The animation system according to the invention comprises a receiver 305, for example of the set-top box type (or reception box), for receiving the signals 303 and 304 via reception means which are not shown. The reception means correspond for example to a demodulator or to a demultiplexer.

The receiver 305 comprises extraction means 306 for extracting from said scene description signal 304 the movement parameters of said animated object O, and generating a primary signal comprising said movement parameters. This extraction amounts to defining a new description signal in which only the hierarchical graph structure of the animated scene element O is kept, as illustrated by the graph R-SG.

The receiver 305 comprises transmission means 307 for transmitting said primary signal PS to the robot. These transmission means 307 effect a coding of the primary signal according to various transportation protocols. For example, the primary signal can be inserted in an MPEG-2 transportation flow by a multiplexer before being transmitted packet by packet over a network. The primary signal can also be coded by a coder according to the DECT, BLUETOOTH, GPRS or UMTS transportation protocols before being sent over a wireless network. For example, in the context of a domestic application, the receiver 305 will for example advantageously comprise a transmission module 307 for transmitting the signal PS according to the BLUETOOTH transportation protocol.

The receiver 305 can also transmit an audio-type scene element to the robot R via said transmission means 307.

In order to process the signal PS, the robot R comprises processing means identical to those described in FIG. 1.

According to an additional characteristic, the receiver 305 comprises scene composition means 308 for generating a scene signal 309 from the multimedia data signal 303 and the scene description signal 304, the content of said scene signal 309 being intended to be played by display and listening means 310 of the television receiver type.

According to an additional characteristic, the robot R comprises modification means for modifying the sets of parameters included in the signal PS. These modification means make it possible to adapt the sets of parameters comprised in the primary signal to the capabilities of the robot. Thus, if movement parameters are such that the capabilities of the robot do not make it possible to reproduce the corresponding movement, said movement parameters are modified, or even omitted. For example, if a set of parameters associated with a movable part describes a translation defined by a unitary vector and its norm and the robot is not in a position to reproduce a translation movement of such a magnitude, the movement parameters are for example initialized so as to prevent the robot from attempting to reproduce this movement, or the norm of the unitary vector is reduced so as to enable the robot to be able to reproduce this translation movement partially.

According to an additional characteristic, the robot comprises:
  means of voice recognition of an external audio signal in order to generate a voice parameter,
  matching means for matching said voice parameter with additional movement parameters characterizing the movement of one or more movable parts of the robot, said generation means generating a control signal from said additional movement parameters.

This additional characteristic enables a user to interact with the movement of the movable parts of the robot by voice.

According to an additional characteristic, the robot comprises means of retransmitting said primary signal, for example to other distant robots or items of equipment requiring the movement parameters contained in the primary signal. In this context, the robot R behaves like a transmitting terminal.

The invention has been described in the case of a coding of a primary signal coded according to the syntax of the MPEG-4 BIFS functionality, in order to transmit movement parameters characterizing a movement which is to be reproduced by the movable parts of a robot. Naturally, any other coding syntax making it possible to describe movement parameters of an animated object forming part of an audio/visual scene could be used for coding such a primary signal without departing from the scope of this invention.

The invention applies also to the transmission of a primary signal comprising sets of movement parameters describing the animation of a face. In this case, a robot receiving such a primary signal would be provided with a face comprising movable parts for reproducing such an animation.

The invention claimed is:

1. An animation system for a robot comprising:
  a) a transmitter comprising:
    means for creating a primary signal comprising sets of parameters for describing the movement of a set of movable parts of an animated object, a set of parameters comprising:
      aa) an identification parameter for associating a movable part with the set of parameters in question,
      bb) movement parameters for describing the movement of the movable part associated with the set of parameters,
    transmission means for transmitting said primary signal,
  b) a robot comprising:
    reception means for receiving said primary signal,
    movable parts able to be moved by control signals,
    processing means for successively processing the sets of parameters comprised in the primary signal received, said processing means comprising:
      aa) association means for, using the identification parameter, associating a movable part of the robot with the set of parameters,
      bb) generation means for, using the movement parameters, generating said control signals to the movable part associated with the set of parameters, for the purpose of making said associated movable part reproduce the movement characterized by said movement parameters.

2. A system as claimed in claim 1, wherein said creation means comprise movement sensing means for generating movement parameters characterizing the movement of each movable part of the animated object.

3. A system as claimed in claim 2, comprising audio coding means for coding an audio signal transmitted by said animated object, in order to generate an audio signal transmitted with said primary signal by said transmission means, said robot comprising means for decoding and reproducing said audio signal.

4. A system as claimed in claim 3, wherein the robot comprises:
  voice recognition means for an external audio signal for generating a voice parameter,
  matching means for matching said voice parameter with additional movement parameters characterizing the movement of one or more movable parts of the robot, said generation means generating a control signal from said additional movement parameters.

5. A system as claimed in claim 4, wherein the robot comprises means for retransmitting said primary signal.

6. The system of claim 1, wherein the sets of parameters are arranged in the primary signal as a hierarchical structure, reflecting a structure and arrangement of the movable parts of the animated object with respect to one another.

7. The system of claim 6, wherein a movement allocated to an upper hierarchy movable part is also applied to a lower hierarchy movable part.

8. The system of claim 1, wherein the transmitter further includes a processor that receives a signal from a movement sensor disposed on a movable part, wherein the signal is indicative of the movement of the movable part.

9. The system of claim 8, wherein the processing means transforms a physical quantity of the signal into a movement parameter of the movement parameters.

10. A video conferencing system that employs the system of claim 1.

11. The system of claim 1, wherein the transmission means includes an audio recorder that records an audio signal, which is transmitted by the transmission means, along with the primary signal, to the robot.

12. An animation system for a robot comprising:
a) a receiver for receiving a multimedia data signal composed of scene elements, associated with a scene description signal for describing said scene elements by means of description parameters, said multimedia data signal comprising an animated scene element comprising a set of movable parts, said scene description signal comprising sets of parameters for describing the movement of said movable parts, the sets of parameters comprising:
   aa) an identification parameter for associating a movable part with the set of parameters in question,
   bb) movement parameters for describing the movement of the movable part associated with the set of parameters,
said receiver comprising:
extraction means for extracting from said scene description signal the movement parameters of said animated object, and generating a primary signal comprising said movement parameters,
transmission means for transmitting said primary signal to the robot;
b) a robot comprising:
reception means for receiving said primary signal,
movable parts able to be moved by control signals,
processing means for successively processing the sets of parameters comprised in the primary signal received, said processing means comprising:
   aa) association means for, using the identification parameter, associating a movable part of the robot with the set of parameters,
   bb) generation means for, using the movement parameters, generating said control signals to the movable part associated with the set of parameters, for the purpose of making said associated movable part reproduce the movement characterized by said movement parameters.

13. A system as claimed in claim 12, wherein the receiver comprises scene composition means for generating a scene signal from the multimedia data signal and the scene description signal, the content of said scene signal being intended to be played by display and listening means.

14. A system as claimed in claim 13, wherein the robot comprises modification means for modifying the sets of parameters comprised in the primary signal received.

15. The system of claim 12, wherein the scene description includes a graph with a hierarchical structure, wherein a first hierarchy of the hierarchical structure describes spatio-temporal characteristics and a second hierarchy of the hierarchical structure describes the movement parameters.

16. The system of claim 12, wherein the multimedia data signal is delivered by a television program supplier.

17. A computer readable storage medium containing instructions which, when executed by a computer, cause the computer to perform the steps of:
generating a signal coded according to coding syntax of the MPEG-4 BIFS functionality;
using the signal to control movement of movable parts of a robot, said coded signal comprising sets of parameters, wherein a set of parameters comprises an identification parameter for associating a movable part with the set of parameters and movement parameters for describing a movement which said movable part is to be made to reproduce.

18. A robot comprising:
reception means for receiving a primary signal, said primary signal comprising sets of parameters for describing the movement of a set of movable parts of an animated object, a set of parameters comprising:
   aa) an identification parameter for associating a movable part with the set of parameters in question,
   bb) movement parameters for describing the movement of the movable part associated with the set of parameters,
movable parts able to be moved by control signals,
processing means for successively processing the sets of parameters included in the primary signal received, said processing means comprising:
   aa) association means for, using the identification parameter, associating a movable part of the robot with the set of parameters,
   bb) generation means for, using the movement parameters, generating said control signals to the movable part associated with the set of parameters, for the purpose of making said associated movable part reproduce the movement characterized by said movement parameters.

19. The system of claim 18, wherein the association means generates a hierarchical structure graph for describing an arrangement of the movable parts of the robot based on the information in the primary signal.

20. The system of claim 18, wherein in the generation means transcribes the movement parameters into an electrical or a pneumatic signal, which enables an actuator to effect the movement to the movable part of the robot.

* * * * *